US010416360B2

(12) United States Patent
Takahagi (10) Patent No.: US 10,416,360 B2
(45) Date of Patent: Sep. 17, 2019

(54) LIGHT DIFFUSION FILM

(71) Applicants: MITSUBISHI GAS CHEMICAL COMPANY, INC., Tokyo (JP); MGC FILSHEET CO., LTD., Saitama (JP)

(72) Inventor: Shohei Takahagi, Fukushima (JP)

(73) Assignees: MITSUBISHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 0 days.

(21) Appl. No.: 15/519,931

(22) PCT Filed: Oct. 15, 2015

(86) PCT No.: PCT/JP2015/079209
§ 371 (c)(1),
(2) Date: Apr. 18, 2017

(87) PCT Pub. No.: WO2016/063792
PCT Pub. Date: Apr. 28, 2016

(65) Prior Publication Data
US 2017/0329057 A1    Nov. 16, 2017

(30) Foreign Application Priority Data
Oct. 24, 2014 (JP) .................. 2014-216873

(51) Int. Cl.
*G02B 5/02*  (2006.01)
*G02F 1/1335*  (2006.01)
(Continued)

(52) U.S. Cl.
CPC ............... *G02B 5/021* (2013.01); *C08J 5/18* (2013.01); *C08K 3/00* (2013.01); *C08L 33/00* (2013.01);
(Continued)

(58) Field of Classification Search
CPC .......... G02B 5/04; G02B 5/02; G02B 5/0278; G02B 5/021; G02B 5/0242; G02B 5/0236;
(Continued)

(56) References Cited

U.S. PATENT DOCUMENTS

2004/0240070 A1    12/2004    Suzuki et al.
2006/0110115 A1     5/2006    Hamamatsu et al.
(Continued)

FOREIGN PATENT DOCUMENTS

JP    2003-302506    10/2003
JP    2006-98912      4/2006
(Continued)

OTHER PUBLICATIONS

Official Communication issued in European Patent Office (EPO) Patent Application No. 15851949.6, dated May 11, 2018.
(Continued)

*Primary Examiner* — Jie Lei
(74) *Attorney, Agent, or Firm* — Greenblum & Bernstein, P.L.C.

(57) ABSTRACT

One embodiment of the present invention provides a light diffusion film, including: 100 parts by mass of a polycarbonate resin (A); 1 to 10 parts by mass of organic fine particles (B); and 0.01 to 0.5 parts by mass of inorganic fine particles (C), wherein the inorganic fine particles (C) have an average particle size of less than 1 μm and a refractive index at a wavelength of 589 nm of 2.00 or more.

10 Claims, 1 Drawing Sheet

(51) Int. Cl.

| | | |
|---|---|---|
| *C08J 5/18* | (2006.01) | |
| *C08K 3/00* | (2018.01) | |
| *C08L 33/00* | (2006.01) | |
| *C08L 69/00* | (2006.01) | |
| *C08L 83/04* | (2006.01) | |
| *F21V 3/00* | (2015.01) | |
| *F21S 2/00* | (2016.01) | |
| *F21V 3/04* | (2018.01) | |

(52) U.S. Cl.
CPC .............. *C08L 69/00* (2013.01); *C08L 83/04* (2013.01); *F21S 2/00* (2013.01); *F21V 3/00* (2013.01); *F21V 3/04* (2013.01); *G02B 5/0236* (2013.01); *G02B 5/0242* (2013.01); *G02B 5/0268* (2013.01); *G02F 1/133504* (2013.01)

(58) Field of Classification Search
CPC .................. G02B 5/0268; G02F 1/1335; G02F 1/133504; C08K 3/00; C08L 83/04; C08L 33/00; C08L 69/00; F21V 3/04; F21V 3/00; F21S 2/00; C08J 5/18
USPC .......................... 359/615, 614, 599, 707, 452
See application file for complete search history.

(56) References Cited

U.S. PATENT DOCUMENTS

| | | | |
|---|---|---|---|
| 2007/0087167 A1* | 4/2007 | Yoshida | ............... G02B 5/0226 |
| | | | 428/143 |
| 2010/0284071 A1 | 11/2010 | Kodama et al. | |
| 2013/0250414 A1 | 9/2013 | Eguchi et al. | |
| 2013/0301135 A1* | 11/2013 | Nishimura | ........... G02B 5/0294 |
| | | | 359/599 |
| 2014/0252330 A1 | 9/2014 | Oh et al. | |
| 2014/0340911 A1 | 11/2014 | Woo et al. | |

FOREIGN PATENT DOCUMENTS

| | | |
|---|---|---|
| JP | 2006-111713 | 4/2006 |
| JP | 3916477 | 5/2007 |
| JP | 2007-272208 | 10/2007 |
| KR | 10-1392347 B1 | 5/2014 |
| TW | 200730886 A | 8/2007 |
| WO | 2007/072856 A1 | 6/2007 |

OTHER PUBLICATIONS

International Search Report issued in WIPO Patent Application No. PCT/JP2015/079209, dated Jan. 12, 2016.

* cited by examiner

LIGHT DIFFUSION FILM

TECHNICAL FIELD

The present invention relates to a light diffusion film which can be used for a backlight of display devices or the like.

BACKGROUND ART

Figure 1:
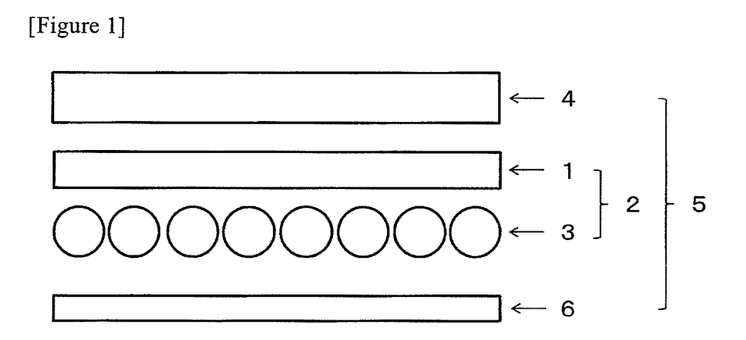
FIG. 1 is a schematic view showing a flat panel display device.

Flat panel display devices such as liquid crystal displays which are distributed in the market at present have a structure as shown, for example, in FIG. 1. Specifically, a flat panel display device 5 has a backlight 2 on the back side of picture elements 4, and the backlight 2 has light sources 3 and a light diffusion plate 1 (hereinafter also referred to as a "light diffusion film" with respect to the present invention) for uniformly diffusing the light from the light sources 3 to the side of the picture elements 4. The mode of the backlight 2 is roughly divided into a direct type and an edge light type, and FIG. 1 shows a direct backlight. In the direct backlight, a plurality of light sources 3 are arranged directly behind the light diffusion plate 1, as shown in FIG. 1. Further, a reflector plate 6 is usually arranged on the opposite side of the light sources 3 from the light diffusion plate 1.

In the case of a direct backlight, since the light sources are arranged directly behind a light diffusion plate, the distance from the light sources to the light diffusion plate is generally short, and the light passage distance in the light diffusion plate is also short. Therefore, a light diffusion plate which can sufficiently diffuse the light from each light source is required so that the luminance unevenness resulting from using a plurality of light sources does not occur.

As a material for a light diffusion plate, there is known a light diffusion plate in which a light-diffusing agent is dispersed in a polycarbonate resin in order to increase light diffusibility (Patent Documents 1 and 2). For example, Patent Document 1 proposes a light diffusion film in which 1 to 20 parts by mass of particles having an average particle size of 1 to 25 μm are added to a polycarbonate resin to impart an uneven shape to the surface. Further, Patent Document 2 describes that light-diffusing agents such as inorganic particles and/or organic particles may be dispersed in a polycarbonate resin in the production of a light diffusion plate. However, conventional light diffusion plates (or light diffusion films) have had a problem that light diffusibility and light source shape-hiding properties are reduced as the thickness of the light diffusion plates is reduced.

PRIOR ART DOCUMENTS

Patent Documents

Patent Document 1:
  Japanese Patent No. 3916477
Patent Document 2:
  Japanese Patent Laid-Open No. 2006-98912

SUMMARY OF INVENTION

Problems to be Solved by Invention

An object of the present invention is to provide a light diffusion film excellent in light diffusibility, light source shape-hiding properties, and the like.

Solution to Problem

As a result of intensive studies to solve the above problems, the present inventors have found that a light diffusion film excellent in light diffusibility, light source shape-hiding properties, and the like is obtained by adding specific organic fine particles and inorganic fine particles to a polycarbonate resin, and the present invention has been completed based on this finding.

The present invention is, for example, as follows.
[1] A light diffusion film, including:
  100 parts by mass of a polycarbonate resin (A);
  1 to 10 parts by mass of organic fine particles (B); and
  0.01 to 0.5 parts by mass of inorganic fine particles (C),
  wherein the inorganic fine particles (C) have an average particle size of less than 1 μm and a refractive index at a wavelength of 598 nm of 2.00 or more.
[2] The light diffusion film according to [1], wherein the inorganic fine particles (C) includes a transition metal.
[3] The light diffusion film according to [2], wherein the inorganic fine particles (C) are fine particles of titanium oxide, zirconia, zinc, or zinc sulfide.
[4] The light diffusion film according to any of [1] to [3], wherein the organic fine particles (B) are of at least one type selected from acrylic polymer fine particles and silicone polymer fine particles.
[4-1] The light diffusion film according to [4], wherein the organic fine particles (B) have a difference in refractive index of 0.01 to 0.30 in an absolute value from the polycarbonate resin.
[4-2] The light diffusion film according to any one of [1] to [4-1], wherein the organic fine particles (B) have an average particle size of 1 to 15 μm.
[5] The light diffusion film according to any of [1] to [4-2], wherein at least one surface of the light diffusion film has an arithmetic average roughness of 1 to 10 μm.
[6] The light diffusion film according to any of [1] to [5], wherein the light diffusion film has a thickness of 100 to 500 μm.
[7] The light diffusion film according to any of [1] to [6], wherein the light diffusion film has a total light transmittance of 50 to 90% and a haze of 90% or more.
[8] The light diffusion film according to any of [1] to [7], wherein the light diffusion film is a light diffusion film for a backlight.

Effects of Invention

The present invention can provide a light diffusion film excellent in light diffusibility, light source shape-hiding properties, and the like.

DESCRIPTION OF EMBODIMENTS

Hereinafter, the embodiments of the present invention will be described with appropriate reference to drawings. Note that, in each Figure, the same reference characters will be given to the components which exhibit the same or similar function, and overlapping descriptions will be omitted. Further, the materials, constitutions, and the like to be described below do not limit the present invention, but can be variously changed within the range of the gist of the present invention.

<Constitution of Light Diffusion Film>

One embodiment of the present invention provides a light diffusion film, including:

100 parts by mass of a polycarbonate resin (A);
1 to 10 parts by mass of organic fine particles (B); and
0.01 to 0.5 parts by mass of inorganic fine particles (C),
wherein the inorganic fine particles (C) have an average particle size of less than 1 µm and a refractive index at a wavelength of 589 nm of 2.00 or more.

The light diffusion film according to an embodiment is excellent in light diffusibility and light source shape-hiding properties. Therefore, it can be suitably used as a light diffusion plate for the backlight of a display device, particularly a direct backlight. Here, "excellent in light diffusibility" means that, when light from light sources passes through a light diffusion film, the light is more diffused. The use of a light diffusion film excellent in light diffusibility can prevent the luminance unevenness resulting from using a plurality of light sources and send a more uniform light to picture elements. Further, "excellent in light source shape-hiding properties" means that, when light sources are observed through a light diffusion film, the visibility of light source shape is low. Since light sources are located directly in back of a liquid crystal panel in a direct backlight, the image of the light sources will be observed through a screen as it is. Therefore, in order to hide the image of the light sources, a light diffusion plate is generally used, but it is preferred to use a light diffusion film in which the light source shape is hidden more in terms of preventing luminance unevenness and sending a more uniform light to picture elements.

Generally, if the light diffusibility of a light diffusion plate is intended to be increased, a problem of a decrease in the total light transmittance and luminance will occur. Thus, though a light diffusion plate has a relatively simple structure, the optical system of a backlight is complicated, and it is difficult to finally obtain well-balanced optical properties. One embodiment of the present invention can provide a light diffusion film having well-balanced optical properties because total light transmittance, haze, and the like in a preferred range are obtained in addition to the above light diffusibility and light source shape-hiding properties. A more uniform, bright, and high-resolution image is obtained by using such a light diffusion film as a light diffusion plate in the backlight of a display device. Further, according to an embodiment, since the above effect is obtained with a light diffusion film having a relatively small thickness, a reduction in weight of a product can be achieved, which is economically preferred. Furthermore, the light diffusion film according to an embodiment also has an advantage that when it is produced by extrusion, film extrusion can be stably performed, and a uniform film can be obtained.

The reason why the above effect is obtained by an embodiment is not clear, but it is inferred as follows:

The light diffusibility and light source shape-hiding properties are improved when organic fine particles and inorganic fine particles are used in combination than when only the organic fine particles or only the inorganic fine particle are incorporated.

In the case where the organic fine particles and the inorganic fine particles are used in combination, the light diffusibility and light source shape-hiding properties will be reduced if the amount of organic fine particles is excessively small, and light-transmitting properties will be reduced if the amount of organic fine particles is excessively large. Further, the light diffusibility and light source shape-hiding properties will not be improved if the amount of inorganic fine particles is excessively small, and the light-transmitting properties will be reduced if the amount of inorganic fine particles is excessively large. When these are taken into consideration, blending a polycarbonate resin, organic fine particles, and inorganic fine particles at a predetermined mass ratio will probably contribute to the improvement in light diffusibility, light source shape-hiding properties, and the like.

Since the number of the inorganic fine particles which are present in the light diffusion film will decrease if the particle size of the inorganic fine particles is excessively large, the light diffusibility and light source shape-hiding properties will be reduced. Therefore, the use of inorganic fine particles having an average particle size of less than 1 µm will probably contribute to the improvement in light diffusibility, light source shape-hiding properties, and the like. Further, light diffusibility will be reduced if the refractive index of inorganic fine particles is less than 2.00. Therefore, the use of inorganic fine particles having a refractive index of 2.00 or more will probably contribute to the improvement in light diffusibility.

Further, a light diffusion film more excellent in light diffusibility and light source shape-hiding properties can be produced by imparting uneven shape to a film surface.

When these are comprehensively taken into consideration, according to the above embodiment, it is probably possible to produce a light diffusion film having an improvement in light diffusibility and light source shape-hiding efficiency and having a balance between these properties and other properties such as total light transmittance when inorganic fine particles play the role of assisting the light diffusibility of organic fine particles.

Hereinafter, materials which constitute a light diffusion film will be sequentially described.

(A) Polycarbonate Resin

The polycarbonate resin contained in the light diffusion film according to an embodiment is not particularly limited as long as it is generally classified as a polycarbonate resin. For example, as described in the 152nd page to the 153rd page of "Plastic Reader" (the 14th revision) (May 10, 1985, issued by Plastic Age, Inc.), the polycarbonate resin may be those that can be produced by common methods, such as a phosgene method (solution method) of reacting bisphenol A with phosgene and an ester interchange method (melting method) of reacting bisphenol A with diphenyl carbonate. A catalyst, an end terminator, an antioxidant, and the like may be added in production. Further, the polycarbonate resin may be a branched polycarbonate resin in which a polyfunctional aromatic compound having three or more functionality is copolymerized, or may be a polyester carbonate resin in which aromatic or aliphatic bifunctional carboxylic acid is copolymerized. Further, the polycarbonate resin may be produced by using two or more polycarbonate resins in combination.

The molecular weight of the polycarbonate resin is preferably 13,000 to 40,000, more preferably 14,000 to 38,000, in terms of the viscosity average molecular weight measured from the viscosity of methylene chloride solution at 25° C. Since the strength of a light diffusion film will be insufficient if the viscosity average molecular weight is less than 13,000, a problem that a crack is produced in the light diffusion film may occur. Further, since melt viscosity will be excessively high if the viscosity average molecular weight exceeds 40,000 conversely, a problem that extrusion becomes difficult may occur. Therefore, these viscosity average molecular weights are not preferred.

(B) Organic Fine Particles

The light diffusion film according to an embodiment contains organic fine particles as a light-diffusing agent. The organic fine particles preferably have a difference in refractive index of 0.01 to 0.30 in an absolute value from the polycarbonate resin (here, the refractive index means a refractive index at a wavelength of 598 nm). If the difference in refractive index of the organic fine particles from the polycarbonate resin is less than 0.01 in an absolute value, light diffusibility will tend to be poor. On the other hand, if the absolute value of the difference in refractive index exceeds 0.30, total light transmittance will tend to be greatly reduced.

Specifically, the organic fine particles are preferably polymer fine particles, and particularly, examples thereof include acrylic polymer fine particles in which the main component is an acrylic compound and silicone polymer fine particles in which the main component is a silicone compound. The organic fine particles may be a single-structure compound or a copolymer, and may be produced by using one type alone or two or more types in combination. Further, the organic fine particles may be a material having a core-shell type layer structure or a coated material.

The organic fine particles are contained in the light diffusion film in an amount of 1 to 10 parts by mass, preferably 1 to 8 parts by mass, based on 100 parts by mass of the polycarbonate resin. If the amount of the organic fine particles is less than 1 part by mass, sufficient light diffusibility cannot be obtained. On the other hand, if the amount of the organic fine particles is more than 10 parts by mass, poor feeding of pellets into an extruder may prevent film formation when the pellets are extruded for film extrusion. Further, impact strength will be greatly reduced.

The average particle size of the organic fine particles is 1 μm to 15 μm, preferably 1 μm to 10 μm, more preferably 1 μm to 6 μm. If the average particle size of the organic fine particles is larger than 15 μm, sufficient light diffusibility cannot be obtained, and if it is less than 1 μm, a reduction in the appearance and light diffusibility of the light diffusion film due to poor dispersion may occur. In the present specification, the "average particle size of organic fine particles" means the average particle size of primary particles which has been measured with a transmission electron microscope and defined by the length mean diameter. Here, the length mean diameter is defined by $\Sigma(nd^2)/\Sigma(nd)$, where d represents the representative value of each particle size, and n represents the percent based on the number.

(C) Inorganic Fine Particles

The light diffusion film according to an embodiment contains inorganic fine particles as a light-diffusing agent. As the inorganic fine particles, those having an average particle size of less than 1 μm and a refractive index $n_d$ of 2.00 or more are used. Here, the refractive index $n_d$ means the absolute refractive index for the light with a wavelength of 589 nm. The inorganic fine particles are preferably a material including a transition metal, since such particles have a refractive index $n_d$ of 2.00 or more and low reactivity with a polycarbonate resin. In the present specification, the "transition metal" also includes metals belonging to Group 12 of the Periodic Table (that is, zinc, cadmium, and the like). Specific examples of the transition metal include zinc, chromium, zirconia, cadmium, tungsten, iron, copper, titanium, platinum, and compounds containing these metals (for example, metal oxides, metal sulfides, and the like). Specific examples of the compounds containing the above metals include zinc sulfide, chromium oxide, zirconium oxide, cadmium oxide, cadmium sulfide, iron oxide (divalent and trivalent), copper oxide, and titanium oxide. Among them, titanium oxide, zirconia, zinc, and zinc sulfide are preferred, and titanium oxide is particularly preferred. The inorganic fine particles may be used singly or in combination of two or more. In the present specification, the "average particle size of inorganic fine particles" means the average particle size of primary particles measured with a transmission electron microscope and defined by the length mean diameter. Here, the length mean diameter is defined by $\Sigma(nd^2)/\Sigma(nd)$, where d represents the representative value of each particle size, and n represents the percent based on the number.

The refractive index $n_d$ of the inorganic fine particles is preferably 2.00 to 3.50, more preferably 2.00 to 3.00. If the refractive index $n_d$ is less than 2.00, the light diffusibility of the resulting light diffusion film will be poor since the light reflection performance of the inorganic fine particles is low.

The average particle size of the inorganic fine particles is preferably 0.01 μm or more and less than 1 μm, more preferably 0.1 to 0.5 μm. If the average particle size of the inorganic fine particles is 1 μm or more, total light transmittance will be reduced, and sufficient illumination intensity will not be obtained.

The inorganic fine particles are contained in the light diffusion film in an amount of 0.01 to 0.5 parts by mass, preferably 0.01 to 0.3 parts by mass, based on 100 parts by mass of the polycarbonate resin. If the amount of the inorganic fine particles is less than 0.01 parts by mass, sufficient light diffusibility cannot be obtained. On the other hand, if the amount of the inorganic fine particles is more than 0.5 parts by mass, total light transmittance will be reduced, and sufficient illumination intensity will not be obtained.

The inorganic fine particles may be surface-treated with a conventionally-known surface treatment agent. Examples of the surface treatment agent include a fatty acid, a silane coupling agent, and polyhydrogenmethylsiloxane.

(D) Other Components

The light diffusion film according to an embodiment may further contain well-known additives, such as a light stabilizer, an ultraviolet absorber, a fluorescent brightener, an antioxidant, a release agent, a flame retardant, and an antistatic agent.

Further, the light diffusion film may contain resin components other than the polycarbonate resin as long as an object of the present invention is not impaired. Examples of other resin components which can be incorporated include a polystyrene resin, a high impact polystyrene resin, a hydrogenated polystyrene resin, a polyacrylic styrene resin, an ABS resin, an AS resin, an AES resin, an ASA resin, a SMA resin, a polyalkyl methacrylate resin, a polymethacrylic methacrylate resin, a polyphenylether resin, and an amorphous polyalkylene terephthalate resin.

The above additives and resin components may be used singly or in combination of two or more. However, in order to obtain the effect of using the polycarbonate resin, the resin components other than the polycarbonate resin is preferably 40 parts by mass or less based on 100 parts by mass of the polycarbonate resin.

<Characteristics of Light Diffusion Film>
(1) Total Light Transmittance (Tt)

The light diffusion film according to an embodiment may have a total light transmittance (Tt) of preferably 50 to 90%, more preferably 60 to 85%, and, for example, 60 to 75%. If the total light transmittance is less than 50%, sufficient illumination intensity will not be obtained, and if it exceeds 90%, the shape image of light sources will be easily observed, or luminance unevenness will easily occur. The total light transmittance can be measured according to JIS K-7361.

(2) Haze (H)

The light diffusion film according to an embodiment has a haze (H) of preferably 90% or more, more preferably 95% or more, particularly preferably 99% or more. If the haze is less than 90%, sufficient light diffusibility and light source shape-hiding properties cannot be obtained. The haze can be measured according to JIS K-7136.

(3) Diffusivity (D)

The light diffusion film according to an embodiment has a diffusivity (D) of preferably 30% or more, more preferably 30 to 99%. The calculation method of the diffusivity (D) will be described with reference to FIG. 2. The diffusivity (D) is determined from the following numerical expression (1), where, among transmitted light L0 when incident light Li is incident from the normal direction a on the light diffusion film 1, the intensity of transmitted light L5 to an angle of 5° relative to the normal direction a is defined as $L_5$; the intensity of transmitted light L20 to an angle of 20° relative to the normal direction a is defined as $L_{20}$; and the intensity of transmitted light L70 to an angle of 70° relative to the normal direction a is defined as $L_{70}$.

Figure 2:
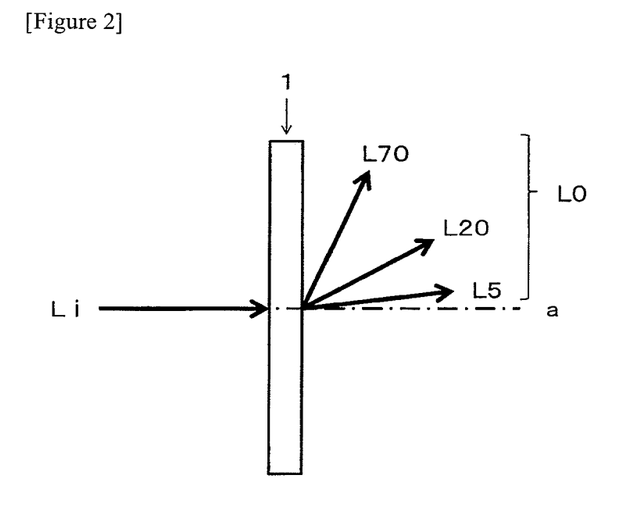
FIG. 2 is a view for describing the calculation method of diffusivity (D).

[Numerical Expression 1]

$$B_\theta = L_\theta / \cos\theta \quad (1)$$
($\theta$ = the angle of transmitted light relative to the normal direction "a")
$$D = \frac{(B_{70} + B_{20})/2}{B_5} \times 100 \ (\%)$$

The diffusivity is generally less than 100%. If the diffusivity (D) is less than 30%, sufficient light diffusibility cannot be obtained.

(4) Degree of Dispersion

The light diffusion film according to an embodiment has a degree of dispersion of preferably 15° or more, more preferably 20° or more. Here, the degree of dispersion means the angle (the angle relative to the normal direction a) of transmitted light having an intensity of 50%, when light Li is incident from the normal direction a on the light diffusion film 1 in FIG. 2 in the same manner as in the measurement of diffusivity, and the intensity of the transmitted light to the normal direction a, that is, the angle of 0°, is defined as 100%. It can be said that the larger the numerical value of the degree of dispersion is, the more excellent in light diffusibility the light diffusion film is. If the degree of dispersion is less than 15°, sufficient light diffusibility cannot be obtained.

<Method for Producing Light Diffusion Film>

The light diffusion film according to an embodiment can be produced, for example, by mixing polycarbonate resin particulates with light-diffusing agents (that is, organic fine particles and inorganic fine particles) to prepare a mixed powder and forming a film from the resulting mixed powder by a known forming method.

Specifically, for example, a polycarbonate resin, light-diffusing agents, and an optional additive are mechanically mixed with a mixer such as a Henschel mixer and a tumbler, and the mixture is then melt-kneaded using an extruder such as a single screw extruder and a twin screw extruder, various kneaders, and the like to obtain a polycarbonate resin composition. Next, the resulting resin composition is formed into a film by a common forming method such as extrusion, injection molding, and pressing. More specifically, for example when extrusion is used, the light diffusion film according to an embodiment can be produced by melt-kneading the polycarbonate resin composition using an single screw extruder or a twin screw extruder and then extruding the kneaded material through a T-die and a roll unit.

The light diffusion film according to an embodiment may have an uneven structure on at least one surface. When the light diffusion film has an uneven structure on a surface, light can be diffused more by so-called outdiffusion. The uneven structure on at least one surface of the light diffusion film has an arithmetic average roughness (Ra) of preferably 1 to 10 μm, more preferably 1 to 8 μm, particularly preferably 2 to 6 μm. If the arithmetic average roughness (Ra) is smaller than 1 μm, sufficient light diffusibility cannot be obtained. On the other hand, if the arithmetic average roughness (Ra) is larger than 10 μm, luminance unevenness will occur, and uniform diffusibility cannot be obtained. The arithmetic average roughness (Ra) can be measured according to JIS B0601: 2001. The arithmetic average roughness on the surface of the light diffusion film can be appropriately adjusted, for example, by modifying the surface of a cooling roll of an extruder used during the extrusion.

Examples of the methods of providing unevenness on the surface of the light diffusion film include a method of providing unevenness by roll transfer and a method of providing unevenness by cell transfer. Further, a prism structure, a micro-lens structure, a line-and-space structure, a mat structure, and the like are suitably used as the uneven structure. The light diffusibility and light source shape-hiding properties are improved by providing unevenness on the surface of the light diffusion film. Therefore, the amount of light-diffusing agents added can be reduced, which is economically advantageous.

The thickness of the light diffusion film according to an embodiment is preferably in the range of 100 to 500 μm, more preferably 100 to 300 μm, particularly preferably 100 to 200 μm. Generally, it is necessary to thickly form a light diffusion film in order to increase the haze. However, according to the constitution of the light diffusion film according to an embodiment, even a relatively thin film can obtain a high haze. Therefore, even a thin light diffusion film can obtain sufficient light diffusibility and light source shape-hiding properties. The light diffusion film according to an embodiment is particularly used as a light diffusion plate of a display device equipped with a direct backlight, and the reduction in thickness of the light diffusion film is desirable in terms of a reduction in weight of a display device, economical efficiency, and the like.

EXAMPLES

Hereinafter, the present invention will be described in more detail with reference to Examples, but the contents of the present invention are not limited to the Examples.

<Evaluation Method>

The methods for evaluating the light diffusion film prepared in the following Examples and Comparative Examples will be described.

(1) Total Light Transmittance (Tt) and Haze (H)

Total light transmittance (Tt) and haze (H) were measured according to JIS K-7361 and JIS K-7136, respectively, using a haze meter ("HM-150", manufactured by Murakami Color Research Laboratory Co., Ltd.).

(2) Diffusivity (D) and Degree of Dispersion

The intensity of transmitted light which transmitted through a light diffusion film was measured using a goniophotometer ("GP-200", manufactured by Murakami Color Research Laboratory Co., Ltd.), and diffusivity (D) was calculated from the intensity value. Specifically, as described above with reference to FIG. 2, the diffusivity (D) was determined from the formula (1) described above by defining the intensity of transmitted light L5 to an angle of 5° relative to the normal direction a as $L_5$, the intensity of transmitted light L20 to an angle of 20° as $L_{20}$, and the intensity of transmitted light L70 to an angle of 70° as $L_{70}$.

The degree of dispersion was also determined using the same goniophotometer by measuring the angle of transmitted light having an intensity of 50%, when the intensity of the transmitted light to the normal direction a, that is, the angle of 0°, is defined as 100%.

(3) Light Source Shape-Hiding Properties

Light source shape-hiding properties were evaluated by arranging a light diffusion film at a height of 40 mm from light sources in which a plurality of LEDs are arranged and visually observing the light sources through the light diffusion film. The evaluation was performed as follows.

a: Light source shape is not observed.
b: Light source shape is almost not observed.
c: Light source shape is observed.

(4) Extrudability

Figure 3:
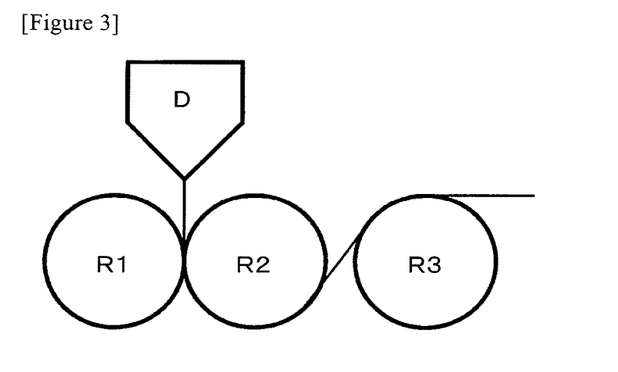
FIG. 3 is a schematic view showing an extruder used in Examples.

Extrudability was evaluated by determining whether extrusion could be stably performed or not when extrusion was performed using a twin-screw extruder having a screw diameter of 26 mm as shown in the following Examples and Comparative Examples. The outline of the extruder is shown in FIG. 3. With respect to extrusion conditions, the barrel temperature was 280° C.; the die (D) temperature was 300° C.; the temperature of the pressure roll (R1) shown in FIG. 3 was 40° C.; the temperature of the first cooling roll (R2) shown in FIG. 3 was 150° C.; and the temperature of the second cooling roll (R3) shown in FIG. 3 was 130° C. Here, the surface of the first cooling roll (R2) is modified so that an uneven structure is formed on the surface of a light diffusion film when the light diffusion film is fed onto the first cooling roll. The stability of extrusion was determined by the torque variation, resin pressure variation, and discharge variation during film extrusion.

a: Possible to stably perform film extrusion
b: Difficult to stably perform film extrusion (5) Surface Texture The surface texture of a light diffusion film was evaluated by arithmetic average roughness (Ra). The arithmetic average roughness was measured according to JIS B0633: 2001 using a surface texture measuring instrument ("CNC Hybrid CS H-5000 CNC", manufactured by Mitutoyo Corp.). Further, when the surface of a light diffusion film has no uneven shape, the surface was defined as a "mirror surface."

Example 1

100 parts by mass of a polycarbonate resin ("Iupilon E-2000F", manufactured by Mitsubishi Engineering-Plastics Corporation) produced from bisphenol A and phosgene by an interfacial polymerization method, 5 parts by mass of acrylic polymer fine particles ("Chemisnow KMR-3TA", average particle size: 3 μm, manufactured by Soken Chemical & Engineering Co., Ltd.), and 0.2 parts by mass of titanium oxide ("TIPAQUE PC-3", average particle size: 0.21 μm, refractive index $n_d$=2.71, manufactured by Ishihara Sangyo Kaisha, Ltd.) were mixed in a tumbler, and the resulting mixture was pelletized by melt-kneading with a twin-screw extruder. The resulting pellets were extruded with a twin-screw extruder having a screw diameter of 26 mm to obtain a light diffusion film having a thickness of about 180 μm. The extrusion conditions here are as described in the above "(4) Extrudability", and a light diffusion film having a matte structure (arithmetic average roughness (Ra)=3 μm) on the surface was obtained.

Example 2

A light diffusion film was prepared in the same manner as in Example 1 except that extrusion was performed using such a cooling roll that provides a light diffusion film in which the surface thereof has an arithmetic average roughness (Ra) of 5 μm.

Example 3

A light diffusion film was prepared in the same manner as in Example 1 except that extrusion was performed using such a cooling roll that provides a light diffusion film in which the surface texture thereof is a mirror surface.

Examples 4 and 5

Light diffusion films were prepared in the same manner as in Example 1 except that the contents of organic fine particles and inorganic fine particles were changed as shown in Table 1.

Example 6

A light diffusion film was prepared in the same manner as in Example 2 except that the contents of organic fine particles and inorganic fine particles were changed as shown in Table 1.

Example 7

A light diffusion film was prepared in the same manner as in Example 1 except that the contents of organic fine particles and inorganic fine particles were changed as shown in Table 1.

Example 8

A light diffusion film was prepared in the same manner as in Example 2 except that acrylic polymer fine particles ("Staphyloid GM-0630H", average particle size: 6 μm, manufactured by Aika Kogyo Co., Ltd.) were used as organic fine particles.

Example 9

A light diffusion film was prepared in the same manner as in Example 2 except that silicone polymer fine particles ("STAROR B-L SL-200M", average particle size: 1.7 μm, manufactured by Samsung) were used as organic fine particles, and the contents of organic fine particles and inorganic fine particles were changed as shown in Table 1.

Comparative Examples 1 to 4

Light diffusion films were prepared in the same manner as in Example 1 except that the contents of organic fine particles and inorganic fine particles were changed as shown in Table 1.

Comparative Example 5

A light diffusion film was prepared in the same manner as in Example 1 except that calcium carbonate (precipitated calcium carbonate "KFW-200", average particle size: 1.2 µm, refractive index $n_d$=1.59, manufactured by HAYASHI KASEI CO., LTD.) was used as inorganic fine particles, and the amount of organic fine particles and inorganic fine particles blended was changed as shown in Table 1.

Comparative Example 6

A light diffusion film was prepared in the same manner as in Example 1 except that zinc oxide (large particle zinc oxide "LPZINC-2", average particle size: 2.0 µm, refractive index $n_d$=2.00, manufactured by Sakai Chemical Industry Co., Ltd.) was used as inorganic fine particles.

Comparative Example 7

A light diffusion film was prepared in the same manner as in Example 1 except that glass beads (low-alkali glass "EMB-10", average particle size: 5.0 µm, refractive index $n_d$=1.51, manufactured by Potters-Ballotini Co., Ltd.) were used as inorganic fine particles, and the amount of organic fine particles and inorganic fine particles blended was changed as shown in Table 1.

Comparative Example 8

A light diffusion film was prepared in the same manner as in Example 1 except that silica ("Sciqas", average particle size: 0.4 µm, refractive index $n_d$=1.45, manufactured by Sakai Chemical Industry Co., Ltd.) was used as inorganic fine particles.

Comparative Example 9

A light diffusion film was prepared in the same manner as in Example 1 except that, as the base resin, 100 parts by mass of acrylic resin (Acrypet "VH001", manufactured by Mitsubishi Rayon Co., Ltd.) was used instead of polycarbonate resin, and, in the extrusion conditions, the barrel temperature was set at 260° C.; the die temperature was set at 280° C.; the first cooling roll (R2) temperature was set at 100° C.; and the second cooling roll (R3) temperature was set at 110° C.

The light diffusion films prepared in Examples 1 to 9 and Comparative Examples 1 to 9 were evaluated for the total light transmittance (Tt), haze (H), diffusivity (D), degree of dispersion, light source shape-hiding properties, extrudability, and surface texture as described in the above <Evaluation Method>. The results are shown in Table 1. In Table 1, the amounts (parts by mass) of organic fine particles and inorganic fine particles blended are the values when the polycarbonate resin is set at 100 parts by mass. The inorganic fine particles used in Examples 1 to 9 and Comparative Examples 1 to 9 are inorganic fine particles surface-treated with 3% of hydrogenmethylsiloxane. Note that, in Comparative Examples 1 and 5, evaluable light diffusion films were unable to be obtained since it was impossible to stably perform extrusion.

Note that, in Table 1, the light-diffusing agents A to H are as follows.

A: acrylic polymer fine particles ("Chemisnow KMR-3TA", manufactured by Soken Chemical & Engineering Co., Ltd.)

B: acrylic polymer fine particles ("Staphyloid GM-0630H", manufactured by Aika Kogyo Co., Ltd.)

C: silicone polymer fine particles ("STAROR B-L SL-200M", manufactured by Samsung)

D: titanium oxide ("TIPAQUE PC-3", n=2.71, manufactured by Ishihara Sangyo Kaisha, Ltd.)

E: calcium carbonate (precipitated calcium carbonate "KFW-200", n=1.59, manufactured by HAYASHI KASEI CO., LTD.)

F: zinc oxide (large particle zinc oxide "LPZINC-2", n=2.00, manufactured by Sakai Chemical Industry Co., Ltd.)

G: glass beads (low-alkali glass "EMB-10", n=1.51, manufactured by Potters-Ballotini Co., Ltd.)

H: silica ("Sciqas", n=1.45, manufactured by Sakai Chemical Industry Co., Ltd.)

TABLE 1

| | Light-diffusing agent | | Content of light-diffusing agent (parts by mass) | | | | | | Degree of dispersion (°) | Light source shape-hiding properties | Extrudability |
| --- | --- | --- | --- | --- | --- | --- | --- | --- | --- | --- | --- |
| | Organic fine | Inorganic fine | Organic fine particles | Inorganic fine particles | Surface texture (mm) | Tt (%) | H (%) | D (%) | | | |
| Example 1 | A | D | 5 | 0.2 | Ra = 3 | 64.6 | 99.2 | 54 | 29 | a | a |
| Example 2 | A | D | 5 | 0.2 | Ra = 5 | 62.1 | 99.4 | 74 | 46 | a | a |
| Example 3 | A | D | 5 | 0.2 | Mirror surface | 66.1 | 99.1 | 51 | 26 | a | a |
| Example 4 | A | D | 7.5 | 0.2 | Ra = 3 | 63.4 | 99.3 | 61 | 37 | a | a |
| Example 5 | A | D | 2.5 | 0.2 | Ra = 3 | 64.9 | 98.6 | 36 | 17 | b | a |
| Example 6 | A | D | 5 | 0.02 | Ra = 5 | 73.8 | 99 | 56 | 33 | b | a |
| Example 7 | A | D | 5 | 0.5 | Ra = 3 | 50.1 | 99.4 | 79 | 50 | a | a |
| Example 8 | B | D | 5 | 0.2 | Ra = 5 | 63.5 | 99.5 | 67 | 40 | b | a |
| Example 9 | C | D | 1.5 | 0.2 | Ra = 5 | 62.7 | 99.5 | 75 | 47 | a | a |
| Comparative Example 1 | A | D | 15 | 0.2 | — | — | — | — | — | — | b |
| Comparative Example 2 | A | D | 0.1 | 0.2 | Ra = 3 | 63.9 | 97.2 | 27 | 11 | c | a |
| Comparative Example 3 | A | D | 5 | 2 | Ra = 3 | 10 | 99.5 | 81 | 52 | a | a |

TABLE 1-continued

|  | Light-diffusing agent | | Content of light-diffusing agent (parts by mass) | | Surface texture (mm) | Tt (%) | H (%) | D (%) | Degree of dispersion (°) | Light source shape-hiding properties | Extrudability |
| --- | --- | --- | --- | --- | --- | --- | --- | --- | --- | --- | --- |
|  | Organic fine | Inorganic fine | Organic fine particles | Inorganic fine particles | | | | | | | |
| Comparative Example 4 | A | D | 5 | 0.005 | Ra = 3 | 77.4 | 99.2 | 48 | 13 | c | a |
| Comparative Example 5 | A | E | 5 | 1 | — | — | — | — | — | — | b |
| Comparative Example 6 | A | F | 5 | 0.2 | Ra = 3 | 78.0 | 98.7 | 32 | 13 | c | a |
| Comparative Example 7 | A | G | 5 | 0.1 | Ra = 3 | 78.9 | 98.5 | 29 | 11 | c | a |
| Comparative Example 8 | A | H | 5 | 0.2 | Ra = 3 | 79.1 | 89.2 | 15 | 9 | c | a |
| Comparative Example 9 | A | D | 5 | 0.2 | Ra = 3 | 85.2 | 88.4 | 10 | 5 | c | a |

From Table 1, it can be said that the light diffusion films in Examples 1 to 9 are light diffusion films which are excellent in light diffusibility and light source shape-hiding properties and well-balanced also taking other optical properties into consideration. Further, when the light diffusion films prepared in Examples 1 to 9 were actually used directly abobe LEDs, display devices having uniform and sufficient brightness over the whole surface were obtained.

On the other hand, in Comparative Example 1, it was probably unable to stably perform extrusion because the amount of acrylic polymer fine particles added was as large as 15 parts by mass. In Comparative Example 2, it was probably unable to obtain sufficient light diffusibility and light source shape-hiding properties because the amount of acrylic polymer fine particles added was as insufficient as 0.1 parts by mass. In Comparative Example 3, it was probably unable to obtain sufficient total light transmittance because the amount of titanium oxide added was large as 2 parts by mass. Even if a light diffusion film like obtained in Comparative Example 3 is used for a display device, sufficient illumination intensity will not be obtained. In Comparative Example 4, it was probably unable to obtain sufficient light diffusibility and light source shape-hiding properties because the amount of titanium oxide added was as small as 0.005 parts by mass. Further, in Comparative Example 5, it was probably unable to stably perform extrusion because 1 part by mass of calcium carbonate having a low refractive index was added to cause a reduction in the molecular weight of polycarbonate. In Comparative Example 6, it was probably unable to obtain sufficient light diffusibility because zinc oxide having a large particle size was added. In Comparative Example 7, it was probably unable to obtain sufficient light diffusibility because glass beads having a low refractive index and a large particle size was added. In Comparative Example 8, it was probably unable to obtain sufficient light diffusibility because silica having a low refractive index was added. In Comparative Example 9, it was probably unable to obtain sufficient light diffusibility as a result that the light diffusion effect by organic fine particles was not sufficiently exhibited since acrylic resin was used as the base resin.

Although several embodiments of the present invention have been described, these embodiments are presented as examples only and are not intended to limit the scope of the invention. These new embodiments can be performed in other various modes, and various omissions, substitutions and changes can be made without departing from the spirit of the invention. These embodiments and modifications thereof are included in the scope and spirit of the invention, and included in the invention described in the claims and its equivalent scope.

REFERENCE SIGNS LIST

1 . . . Light diffusion plate, 2 . . . Backlight, 3 . . . Light sources, 4 . . . Picture elements, 5 . . . Flat panel display device 6 . . . Reflector plate, a . . . Normal direction, Li . . . Incident light, L0 . . . Transmitted light, L5 . . . Transmitted light to an angle of 5° relative to the normal direction, L20 . . . Transmitted light to an angle of 20° relative to the normal direction, L70 . . . Transmitted light to an angle of 70° relative to the normal direction, D . . . Die, R1 . . . Pressure roll, R2 . . . First cooling roll, R3 . . . Second cooling roll.

The invention claimed is:

1. A light diffusion film, comprising:
   100 parts by mass of a polycarbonate resin (A);
   1 to 10 parts by mass of organic fine particles (B); and
   0.01 to 0.5 parts by mass of inorganic fine particles (C), wherein
   the inorganic fine particles (C) have an average particle size of 0.1 μm to less than 1 μm and a refractive index at a wavelength of 598 nm of 2.00 or more, and
   wherein the organic fine particles (B) have a difference in refractive index of 0.01 to 0.30 in an absolute value at a wavelength of 598 nm from the polycarbonate resin (A), and
   wherein the light diffusion film has a thickness of from absolutely more than 100 μm to 500 μm.

2. The light diffusion film according to claim 1, wherein the inorganic fine particles (C) comprises a transition metal.

3. The light diffusion film according to claim 2, wherein the inorganic fine particles (C) are fine particles of titanium oxide, zirconia, zinc, or zinc sulfide.

4. The light diffusion film according to claim 1, wherein the organic fine particles (B) are of at least one type selected from acrylic polymer fine particles and silicone polymer fine particles.

5. The light diffusion film according to claim 1, wherein at least one surface of the light diffusion film has an arithmetic average roughness of 1 to 10 μm.

6. The light diffusion film according to claim 1, wherein the light diffusion film has a thickness of about 180 μm to 500 μm.

7. The light diffusion film according to claim 1, wherein the light diffusion film has a total light transmittance of 50 to 90% and a haze of 90% or more.

8. The light diffusion film according to claim 1, wherein the light diffusion film is a light diffusion film for a backlight.

9. The light diffusion film according to claim 1, wherein the organic fine particles (B) have an average particle size of 1 μm to 15 μm.

10. The light diffusion film according to claim 1, wherein the light diffusion film has an arithmetic average roughness (Ra) of 1 to 10 μm.

* * * * *